US008440337B2

(12) United States Patent
Kruger

(10) Patent No.: US 8,440,337 B2
(45) Date of Patent: May 14, 2013

(54) BATTERY SAFETY SYSTEM

(75) Inventor: Duane D. Kruger, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 452 days.

(21) Appl. No.: 12/872,048

(22) Filed: Aug. 31, 2010

(65) Prior Publication Data

US 2012/0052346 A1    Mar. 1, 2012

(51) Int. Cl.
*H01M 2/00* (2006.01)
(52) U.S. Cl.
USPC ............. 429/65; 429/163; 429/175; 429/176; 429/178; 429/179; 429/180; 429/181; 429/182; 429/183; 429/184
(58) Field of Classification Search ............. 429/65, 429/175
See application file for complete search history.

(56) References Cited

U.S. PATENT DOCUMENTS 6,291,095 B1 * 9/2001 Griffey et al. .................. 429/65
7,226,692 B2 * 6/2007 Singer et al. .................. 429/65

2007/0216226 A1  9/2007  Matsumoto et al.
2009/0061298 A1  3/2009  Wu
2009/0181288 A1  7/2009  Sato

* cited by examiner

*Primary Examiner* — Milton I Cano
*Assistant Examiner* — Carmen Lyles-Irving
(74) *Attorney, Agent, or Firm* — Lawrence D. Hazelton

(57) ABSTRACT

A battery safety system that includes a battery terminal configured for making an electrical connection to the system, an electrical disconnect operable to a disconnected state whereby a battery voltage is electrically isolated from the battery terminal, and a connected state, whereby the battery voltage is electrically coupled to the battery terminal. The battery safety system also includes and a terminal guard movable to an exposed position effective to allow making the electrical connection to the battery terminal, and a protected position effective to prevent electrical contact with the battery terminal other than via the electrical connection. The system is configured to prevent the electrical disconnect from being operated to the connected state if the terminal guard is not at the protected position. The system provides a double action safety interlock that makes the action of connecting and disconnecting battery voltage to and from battery terminals or battery cables separate from the action of covering and uncovering the battery terminals, and so reduces the risk of electrical shock when the battery is being manufactured, installed, serviced, or otherwise handled.

10 Claims, 5 Drawing Sheets

BATTERY SAFETY SYSTEM

TECHNICAL FIELD OF INVENTION

The invention generally relates to battery safety, and more particularly relates to preventing inadvertent electrical contact with high voltage or high power batteries such as those used in electric vehicles.

BACKGROUND OF INVENTION

It has been suggested that a person may be injured by electrical contact with voltages greater that 50V. It is desirable for electric vehicle batteries to have a battery voltage greater than 50V as increasing the battery voltage generally reduces the current demands. Safety devices have been suggested that have a protective guard or cover over a battery terminal that is also configured to simultaneously disconnect battery voltage from the battery terminal when the guard is removed. Japanese Patent Application Publication Number 04-324244 by Michiro et al. published Nov. 13, 1992 and United States Patent Application 2007/0216226 by Matsumoto et al. published Sep. 20, 2007 each show a battery safety system with a guard covering a battery terminal. In each, the battery voltage is disconnected from a battery terminal as the guard is moved to uncover the battery terminal. Michiro (JP04324244) shows an arrangement that removes a portion of the conductive path from the battery terminal to the battery voltage as the guard is removed. Matsumoto (US2007/0216226) shows a switch being actuated as the guard is removed. However, such single action arrangements that simultaneously remove battery voltage from the battery terminal as the guard is removed may allow access to battery voltage by small objects (e.g.—a finger tip or small tool) when the guard is partially removed and the electrical connection between the battery terminal and battery voltage is still present.

SUMMARY OF THE INVENTION

The invention described herein provides a double action safety interlock that prevents battery voltage from being coupled to a battery terminal if a terminal guard is not properly positioned to prevent contact with the battery terminal.

In accordance with one embodiment of this invention, a battery safety system is provided. The battery safety system includes a battery terminal, an electrical disconnect, and a terminal guard. The battery terminal is configured to make an electrical connection to the system. The electrical disconnect is operable to a disconnected state whereby a battery voltage is electrically isolated from the battery terminal, and a connected state, whereby the battery voltage is electrically coupled to the battery terminal. The terminal guard is movable to an exposed position effective to allow making the electrical connection to the battery terminal, and a protected position effective to prevent electrical contact with the battery terminal other than via the electrical connection. By this arrangement, the system prevents the electrical disconnect from being operated to the connected state if the terminal guard is not at the protected position.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

In accordance with an embodiment of a battery safety system, FIGS. 1-5 illustrate a battery safety system 10. In general, the battery safety system provides a cover and/or guard over high voltage contacts of a battery and an electrical disconnect that inhibits the presence of high voltage unless a guard or a cover is properly positioned to prevent access to the high voltage contacts. The system 10 is generally configured to prevent access to high voltage during manufacturing and during subsequent installation into an electric vehicle, for example.

Figure 1:
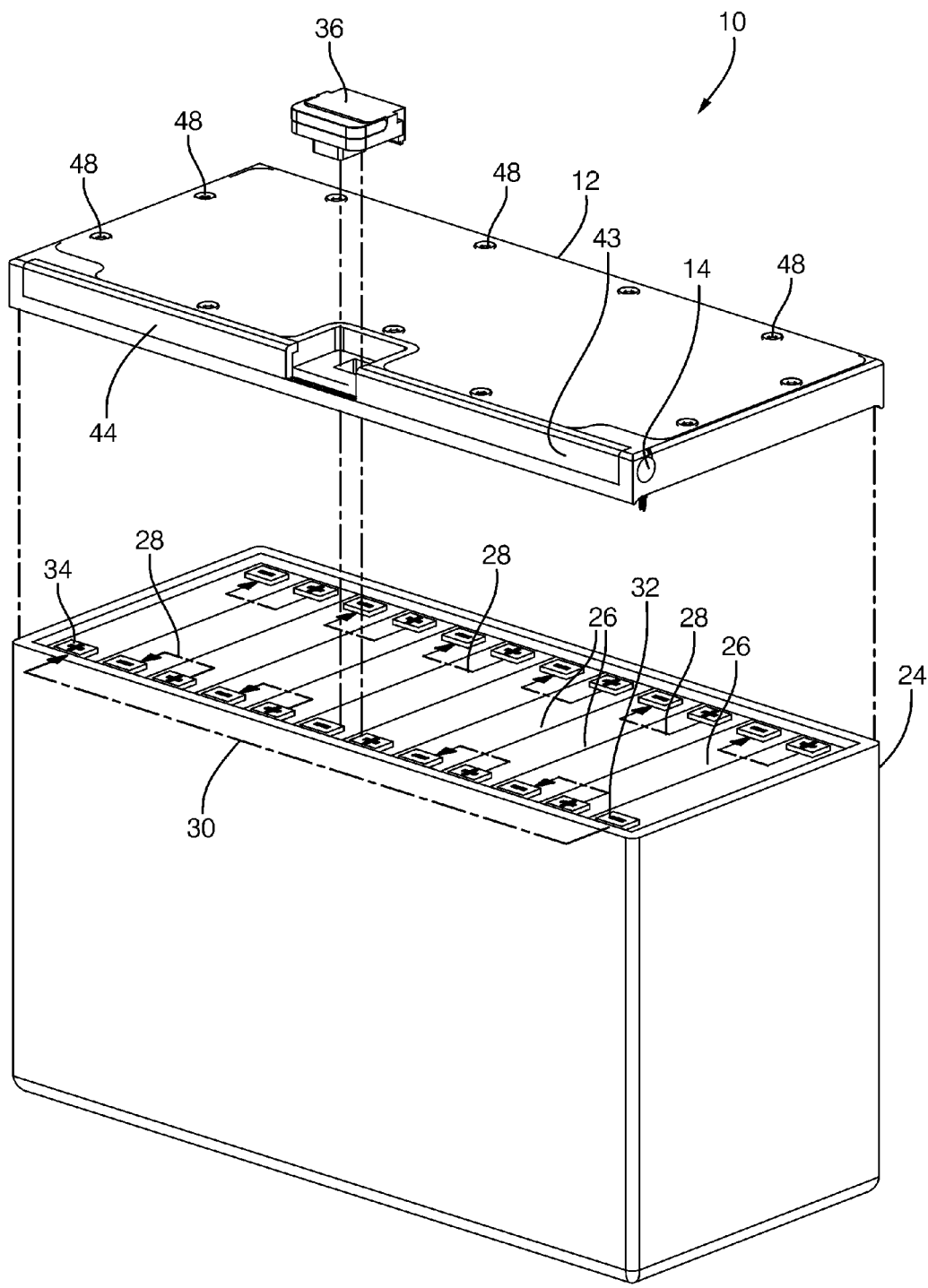
FIG. 1 is a perspective view of a battery safety system prior to assembly in accordance with one embodiment.

FIG. 1 illustrates an embodiment of the system 10 that includes a battery cover 12. The battery cover 12 may include an access hole 14 through which a battery cable 16 can make an electrical contact with a battery terminal 18, see FIG. 3. The access hole 14 is generally sized and shaped so that when the battery cable 16 is positioned to pass through the access hole 14, any other electrical contact with the battery terminal 18 through the access hole 14 is generally prevented. The battery cable 16 is preferably securely fastened to the battery terminal 18 to provide a low resistance electrical connection. In one embodiment a bolt 20 is used to fasten the battery cable 16 to the battery terminal 18 together to make an electrical connection 22 of the battery cable 16 to the system 10, see FIG. 4.

Referring again to FIG. 1, an embodiment of the system 10 may include a battery 24 formed of one or more cells 26. In general, each cell 26 outputs a cell voltage when the cell is properly charged. For example, a cell voltage for a charged lithium ion type cell about 3.6 Volts. By interconnecting the cells 26 electrically in series the cell voltages of each cell 26 can be combined such that the battery 24 can output a voltage higher than the individual cell. By way of a non-limiting example, the cells 26 may be interconnected by interconnects 28 such that a battery voltage 30 between a negative terminal 32 and a positive terminal 34 is equal to the sum of the voltages output by each cell 26. FIG. 1 illustrates a non-limiting example of twelve cells 26 interconnected in series. If the cells 26 are all charged lithium ion type cells, the voltage from the negative terminal 32 to the positive terminal 34 will be about 43 Volts. It will be recognized that example of twelve cells forming the battery 24 is a non-limiting example, and that the battery 24 may be formed of any number of cells 26.

The interconnects 28 illustrated in FIG. 1 are conceptual, and that actual interconnects 28 may be pieces of conductive material such as metal to provide an electrically conductive coupling of adjacent cells 26. It is preferable if some or all of the interconnects 28 are located on the underside of the battery cover 12 so that when the battery cover 12 is not attached to the battery 24 as shown in FIG. 1, the voltages present between any two locations on the battery 24 are relatively low and so less likely to cause an injury if contacted by a person. With some or all of the interconnects 28 located in the battery cover 12, the cells 26 are only completely interconnected as suggested in FIG. 1 when the battery cover 12 is coupled with the battery 24 as illustrated in FIGS. 2-5. When the battery cover 12 is coupled to the battery 24 as shown in FIGS. 2-5, the battery terminal 18 may be electrically coupled to the negative terminal 32, and another battery terminal 38 may be electrically coupled to the positive terminal 34.

Figure 2:
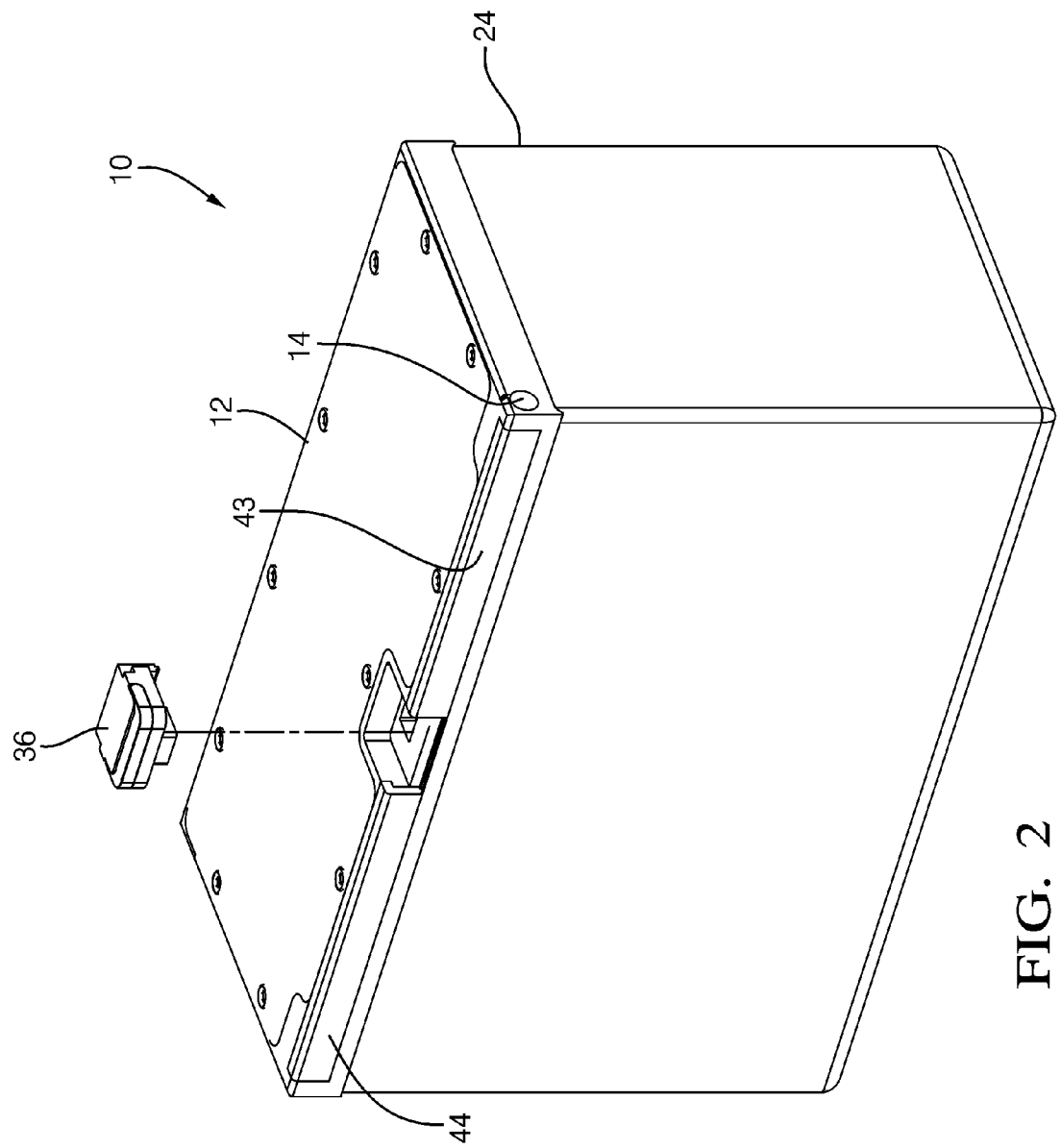
FIG. 2 is a perspective view of a battery safety system prior to connecting battery cables in accordance with one embodiment.
Figure 3:
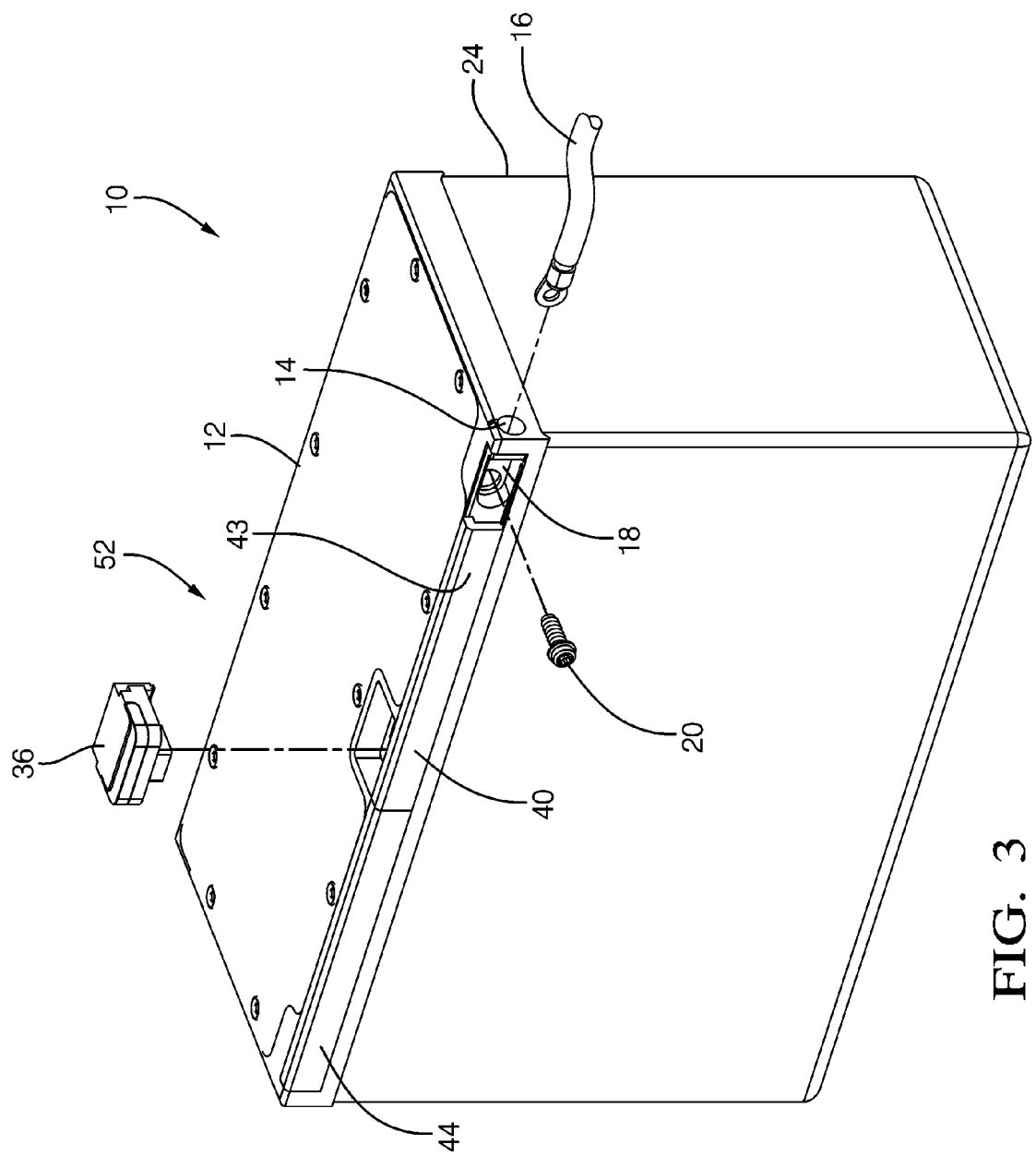
FIG. 3 is a perspective view of a battery safety system during the connecting of battery cables in accordance with one embodiment.
Figure 4:
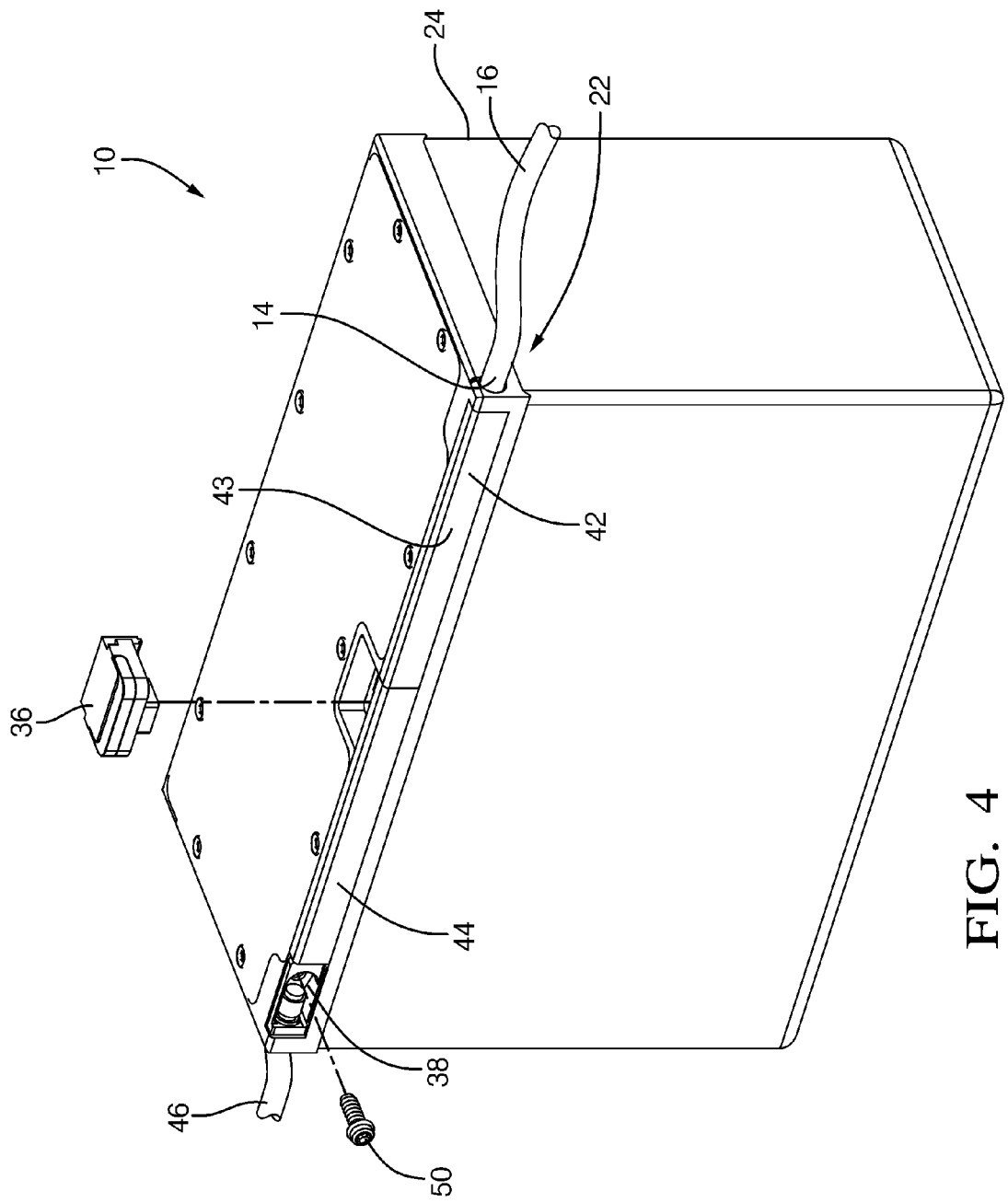
FIG. 4 is a perspective view of a battery safety system during the connecting of battery cables in accordance with one embodiment.

The battery system 10 may also include an electrical disconnect 36. When the electrical disconnect 36 is separated from the battery cover 12 as illustrated in FIG. 2-4, the electrical disconnect 36 may be described as being in a disconnected state. When the electrical disconnect 36 is in the disconnected state, or more generally when the system 10 is in the disconnected state, the battery voltage 30 is electrically isolated from the battery terminals 18 and 38. As used herein, electrically isolated means that there is an open-circuit or sufficiently high resistance connection in the electrical path between the battery terminals 18 and 38 such that if either or both of the battery terminals 18 and 38 were contacted, there would be insufficient electrical energy to be likely to cause injury to a person.

In one embodiment, the electrical disconnect 36 may correspond to one of interconnects 28 as suggested in FIG. 1 by adjacent cells in the middle of the battery 24 not being interconnected by an interconnect 28. In this embodiment, when the electrical disconnect is coupled with the battery 24 as illustrated in FIGS. 2-5, the electrical disconnect 36 electrically couples the adjacent cells show as uncoupled in FIG. 1. In another embodiment, the electrical disconnect 36 may be part of an electrical pathway (not shown) between the negative terminal 32 and the battery terminal 18 and/or part of an electrical pathway (not shown) between the positive terminal 34 and the battery terminal 38. The electrical disconnect 36 is illustrated as being a removable object, but other means of mechanically interrupting the electrical pathway of the battery system 10 will be evident to those skilled in the art, such as moving a lever for example. In addition, the electrical pathway may be interrupted electronically by, for example, a MOSFET or other solid state device capable of being operated to a substantially conductive state (i.e.—ON state) and a substantially resistive state (i.e.—OFF state). By employing one or more of such mean for interrupting the electrical pathway, the electrical disconnect 36 is operable to a disconnected state whereby the battery voltage 30 is electrically isolated from the battery terminals 18 and 38.

Contrariwise, the electrical disconnect 36 or system 10 may also be operated to a connected state, whereby the battery voltage 30 is electrically coupled to the battery terminals 18 and 38. When the electrical disconnect 36 is coupled to the battery cover 12, the electrical disconnect 36 may be described as being in a connected state. In one embodiment, operating the electrical disconnect 36 to the connected state may cause one or more of the interconnects 28 to be brought into contact with the cells 26 to complete the electrical pathway between the battery terminals 18 and 38.

The battery system 10 may also include a terminal guard 43 for covering the battery terminal 18 in a manner that electrical contact with the battery terminal 18 is generally prevented, except for by way of the battery cable 16 passing through the access hole 14. In an embodiment, the terminal guard 43 is movable to an exposed position 40 effective to allow making the electrical connection 22 of the battery cable 16 to the battery terminal 18 by securing with the bolt 20, as illustrated in FIG. 3. The terminal guard 43 may also be moved to a protected position 42 as illustrated in FIG. 4 that is generally effective to prevent electrical contact with the battery terminal 18 other than through the battery cable 16 via the electrical connection 22. The battery system 10 may also include another terminal guard 44 configured to be movable to cover battery terminal 38.

Figure 5:
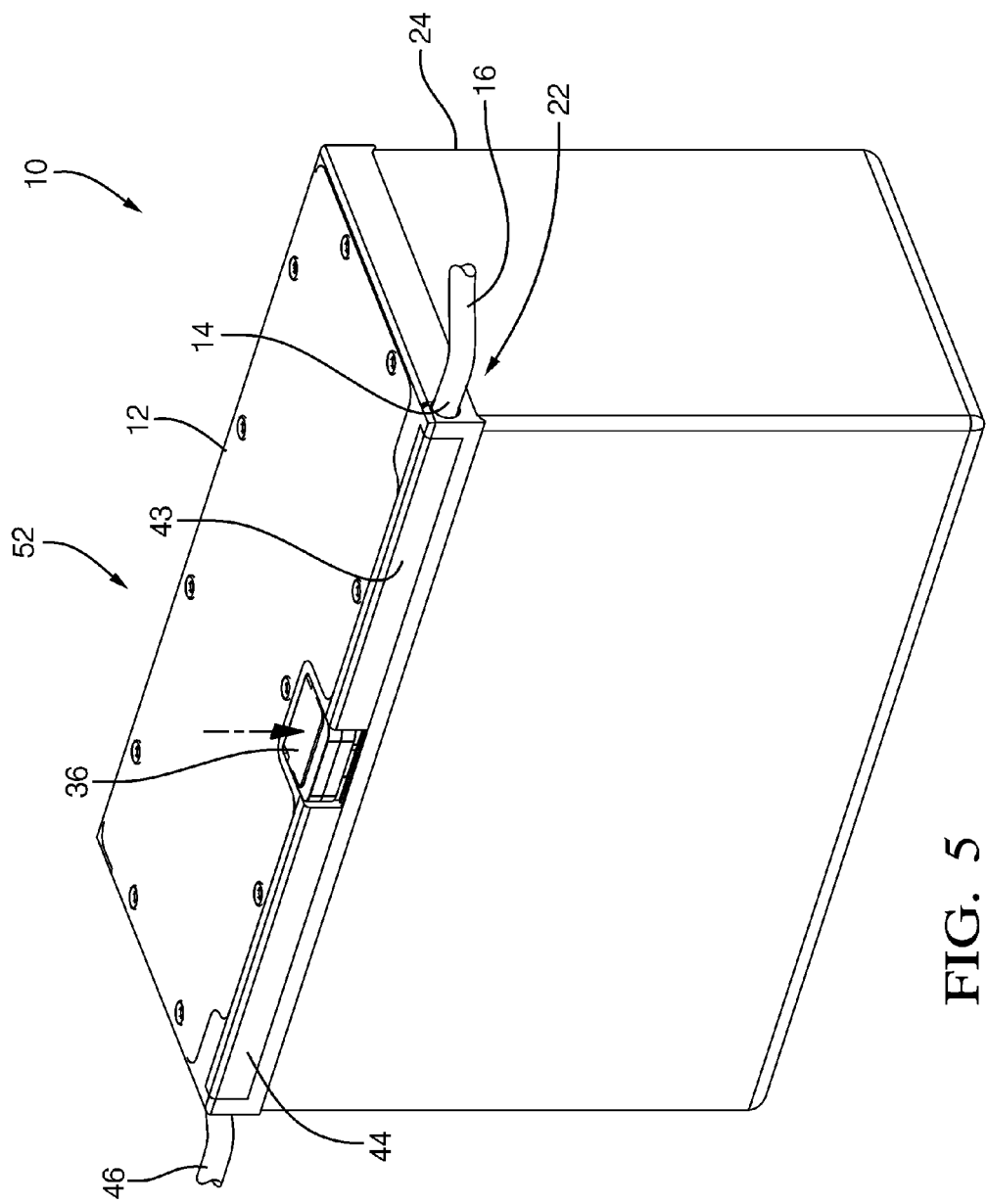
FIG. 5 is a perspective view of a battery safety system after the connecting of battery cables in accordance with one embodiment.

FIGS. 1-5 illustrate a sequence of steps for connecting the battery cable 16 and another battery cable 46 to the battery system 10. FIG. 1 illustrates the battery system 10 prior to the battery cover 12 being coupled to the battery 24. In one embodiment the battery cover 12 may be secured to the battery 24 by one or more screws 48. In FIG. 2 the battery cover 12 is illustrated as secured to the battery 24, but there is no voltage present on the battery terminals 18 and 38 since the electrical disconnect 36 is separated from the battery cover 12. FIG. 3 shows the terminal guard 43 moved to the exposed position 40 so that the battery terminal 18 is exposed and the battery cable 16 can be secured to the battery terminal 18 with the bolt 20. It is noted that the battery system 10 is configured so that the terminal guard 43 cannot be moved to the exposed position 40 if the electrical disconnect 36 were coupled to the battery cover 12 as illustrated in FIG. 5. FIG. 4 shows how the terminal guard 43 must be in the protected position 42 so that the other terminal guard 44 can be moved to expose the battery terminal 38 so that the other battery cable 46 can be secured with another bolt 50. FIG. 5 illustrates how both terminal guards 43 and 44 must be positioned to cover battery terminals 18 and 38 before electrical disconnect 36 can be coupled to battery cover 12. As such, the system 10 prevents the electrical disconnect 36 from being operated to the connected state if either the terminal guard 43 or 44 is not at the respective protected positions. Once the electrical disconnect is coupled to the battery cover 12, the battery voltage will be present across the battery cables 16 and 46. It is noted that the battery system may also be configured so that the terminal guards 43 and 44 are locked at the protected positions when the electrical disconnect is in the connected state, as illustrated in FIG. 5.

It is advantageous that the battery system 10 include the battery cover 12 configured to prevent electrical contact with the battery 24 other than via the battery cables 16 and 46. In one embodiment the battery cover 12, the electrical disconnect 36, and the terminal guard forms a cover assembly 52 that can be manufactured at a location separate from where the battery 24 is assembled.

Accordingly, a battery safety system 10 is provided. The system described herein provides a double action safety interlock that separates the action of connecting and disconnecting battery voltage 30 to battery terminals 18, 38 or battery cables 16, 46 from the action of protecting (or covering) and exposing (or uncovering) the battery terminals 18, 38. By this arrangement, battery cables 16, 46 can be secured to the battery terminals 18, 38 without battery voltage 30 being present on the battery terminals 18, 38. By separating these two actions, the risk of inadvertent contact leading to electrical shock when connecting and disconnecting the battery cables 16, 46 is reduced. Such an arrangement is an improvement over battery safety systems that are single action type systems where the electrical disconnected action happens as the cover or terminal guard is being removed. Furthermore, by including the battery cell interconnects 28 in the battery cover 12, the voltages present between any to locations on the battery 24 prior to attaching the battery cover 12 are reduced and so may reduce the risk of electrical shock to assembly line workers who manufacture the battery 24. It will be apparent that lower voltage batteries capable of delivering large amounts of current, such as lead-acid batteries found in most vehicles with internal combustion engines may also be made safer by using the battery safety system described herein.

While this invention has been described in terms of the preferred embodiments thereof, it is not intended to be so limited, but rather only to the extent set forth in the claims that follow.

I claim:

1. A battery safety system comprising:
   a battery terminal configured to make an electrical connection to the system;
   an electrical disconnect operable to a disconnected state whereby a battery voltage is electrically isolated from the battery terminal, and a connected state, whereby the battery voltage is electrically coupled to the battery terminal; and
   a terminal guard movable to an exposed position effective to allow making the electrical connection to the battery terminal, and a protected position effective to prevent electrical contact with the battery terminal other than via the electrical connection, wherein the system prevents the electrical disconnect from being operated to the connected state if the terminal guard is not at the protected position.

2. The system in accordance with claim 1, wherein said terminal guard is locked at the protected position when the electrical disconnect is in the connected state.

3. The system in accordance with claim 1, wherein said system further comprises a battery for supplying the battery voltage.

4. The system in accordance with claim 1, wherein said system further comprises a battery cover configured to prevent electrical contact with a battery other than via the electrical connection.

5. The system in accordance with claim 4, wherein the battery cover, the electrical disconnect, and the terminal guard form a cover assembly.

6. The system in accordance with claim 4, wherein the battery cover further comprises one or more interconnects configured to electrically couple battery cells when the battery cover is attached to a battery.

7. The system in accordance with claim 6, wherein the system further comprises a battery formed of a plurality of battery cells.

8. A battery safety system comprising:
   a battery terminal configured to make an electrical connection to the system;
   an electrical disconnect operable to a disconnected state whereby a battery voltage is electrically isolated from the battery terminal, and a connected state, whereby the battery voltage is electrically coupled to the battery terminal;
   a terminal guard movable to an exposed position effective to allow making the electrical connection to the battery terminal, and a protected position effective to prevent electrical contact with the battery terminal other than via the electrical connection, wherein the system prevents the electrical disconnect from being operated to the connected state if the terminal guard is not at the protected position and the terminal guard is locked at the protected position when the electrical disconnect is in the connected state; and
   a battery cover configured to prevent electrical contact with a battery other than via the electrical connection.

9. The system in accordance with claim 8, wherein the battery cover further comprises one or more interconnects configured to electrically couple battery cells when the battery cover is attached to a battery.

10. The system in accordance with claim 9, wherein the system further comprises a battery formed of a plurality of battery cells.

* * * * *